United States Patent
Randall (10) Patent No.: US 12,385,466 B2
(45) Date of Patent: Aug. 12, 2025

(54) WIND TURBINE BLADE WITH LIGHTNING PROTECTION SYSTEM AND INTEGRATED WEB-DOWN CONDUCTOR

(71) Applicant: Vestas Wind Systems A/S, Aarhus N. (DK)

(72) Inventor: Stephen Randall, Isle Of Wight (GB)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/694,268

(22) PCT Filed: Sep. 21, 2022

(86) PCT No.: PCT/DK2022/050194
§ 371 (c)(1),
(2) Date: Mar. 21, 2024

(87) PCT Pub. No.: WO2023/046251
PCT Pub. Date: Mar. 30, 2023

(65) Prior Publication Data
US 2024/0392744 A1 Nov. 28, 2024

(30) Foreign Application Priority Data
Sep. 22, 2021 (DK) .......................... PA 2021 70461

(51) Int. Cl.
*F03D 1/06* (2006.01)
*F03D 80/30* (2016.01)

(52) U.S. Cl.
CPC ......... *F03D 1/0687* (2023.08); *F03D 1/0675* (2013.01); *F03D 80/301* (2023.08); *F03D 1/0684* (2023.08); *F05B 2240/30* (2013.01)

(58) Field of Classification Search
None
See application file for complete search history.

(56) References Cited

U.S. PATENT DOCUMENTS

| | | | |
|---|---|---|---|
| 8,133,031 B2* | 3/2012 | Arinaga ................. | H02G 13/40 29/889.71 |
| 8,376,713 B2 | 2/2013 | Kawasetsu et al. | |
| 8,622,710 B2 | 1/2014 | Rindt et al. | |
| 9,702,338 B2* | 7/2017 | Richers ................... | F03D 1/065 |
| 10,519,927 B2* | 12/2019 | Tobin ................. | B29D 99/0028 |
| 10,584,678 B2* | 3/2020 | Caruso .................. | F03D 1/0675 |

(Continued)

FOREIGN PATENT DOCUMENTS

| | | | | |
|---|---|---|---|---|
| CN | 110582633 A | * | 12/2019 | ............. B29C 70/48 |
| CN | 112412696 A | * | 2/2021 | ............. B29C 70/30 |

(Continued)

OTHER PUBLICATIONS

English Translation of WO2015003953A1 (Year: 2015).*

(Continued)

*Primary Examiner* — Courtney D Heinle
*Assistant Examiner* — Esley Le Fisher
(74) *Attorney, Agent, or Firm* — Wood Herron & Evans LLP (57) ABSTRACT

There is provided a wind turbine blade having a root end, a tip end, a blade shell, a lightning protection system and an integrated web-down conductor. The integrated web-down conductor comprises: a down conductor forming part of the lightning protection system: electrical insulation surrounding the down conductor; and a web that surrounds the electrical insulation so as to enclose the down conductor and electrical insulation and is coupled to the blade shell.

18 Claims, 5 Drawing Sheets

(56) References Cited

U.S. PATENT DOCUMENTS

| | | | | |
|---|---|---|---|---|
| 10,648,456 | B2* | 5/2020 | Shain | F03D 80/30 |
| 10,883,479 | B2* | 1/2021 | Whitehouse | F03D 1/0675 |
| 11,313,346 | B2* | 4/2022 | Enevoldsen | F03D 13/10 |
| 11,319,933 | B2* | 5/2022 | Sutton | F03D 1/0675 |
| 11,346,328 | B2* | 5/2022 | Brilliant | F03D 80/30 |
| 12,258,942 | B2* | 3/2025 | Noonan | F03D 80/30 |
| 2009/0053062 | A1* | 2/2009 | Arinaga | F03D 80/30 29/889.71 |
| 2012/0315147 | A1 | 12/2012 | Rindt et al. | |
| 2014/0301857 | A1 | 10/2014 | Richers et al. | |
| 2016/0258423 | A1* | 9/2016 | Whitehouse | F03D 1/0675 |
| 2018/0238301 | A1* | 8/2018 | Tobin | F03D 1/0675 |
| 2019/0376487 | A1* | 12/2019 | Enevoldsen | B29D 99/0028 |
| 2020/0200151 | A1* | 6/2020 | Brilliant | F03D 80/30 |

FOREIGN PATENT DOCUMENTS

| | | | | |
|---|---|---|---|---|
| DE | 20101375 | U1* | 6/2001 | F02K 9/62 |
| EP | 2110552 | A1 | 10/2009 | |
| EP | 2623773 | A2* | 8/2013 | F03D 1/0675 |
| EP | 2675030 | A1* | 12/2013 | F03D 80/30 |
| EP | 3524412 | A1 | 8/2019 | |
| WO | WO-2011080177 | A1* | 7/2011 | F03D 1/0641 |
| WO | WO-2015003953 | A1* | 1/2015 | F03D 1/0675 |
| WO | 2019052616 | A1 | 3/2019 | |

OTHER PUBLICATIONS

English Translation of CN112412696A (Year: 2021).*
English Translation of DE20101375U1 (Year: 2001).*
English Translation of EP2675030A1 (Year: 2013).*
English translation of CN110582633A (Year: 2019).*
Danish Patent and Trademark Office, technical examination issued in corresponding DK Application No. PA 2021 70461, dated Aug. 11, 2022.
International Searching Authority, International Search Report and Written Opinion issued in corresponding PCT Application No. PCT/DK2022/050194, dated Nov. 24, 2022.

* cited by examiner

WIND TURBINE BLADE WITH LIGHTNING PROTECTION SYSTEM AND INTEGRATED WEB-DOWN CONDUCTOR

FIELD OF THE INVENTION

The present invention is in the field of wind turbines, specifically wind turbine blade lightning protection systems.

BACKGROUND OF THE INVENTION

Figure 2:
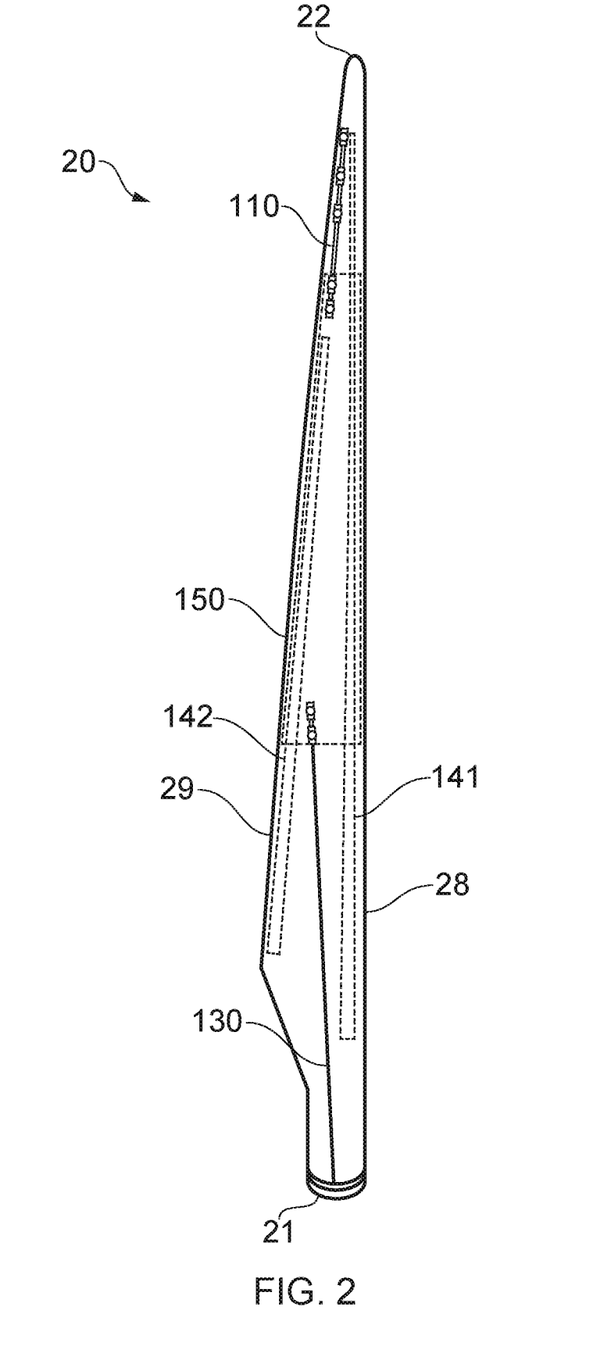
FIG. 2 shows a wind turbine blade having a known lightning protection system.

Wind turbines can be, and often are, struck by lightning, and typically include a lightning protection system. In a typical wind turbine blade construction, at the tip end of the blade, a down conductor will run parallel to the shear web which connects the blade shells. A wind turbine blade having one such lightning protection system is shown in FIG. 2. The tip end of the blade has space constraints within its internal volume, which introduces manufacturing constraints and makes positioning of the lightning protection system components challenging. The parallel down conductor and web have a relatively high mass which introduces relatively high edgewise loads. As such, there is a need for an improved wind turbine blade.

SUMMARY OF THE INVENTION

It has been identified that known lightning protection systems can be improved by the following aspects of the invention, in which electricity passing from a tip of the blade passes through a lightning protection system having an integrated web-down conductor. In the following aspects of the invention, provision of an integrated web-down conductor, as opposed to a separate web and down conductor, benefits from at least some of the following advantages, which will be explained in more detail in relation to the figures:
  a) Improved performance of the blade resulting from an overall mass reduction, caused directly by providing fewer components and indirectly by a reduction in attachment means such as adhesive required;
  b) Better structural performance of the blade, due to a reduction in mass at the tip end;
  c) Improved lightning protection properties of the lightning protection system, due to improved accuracy in locating the down conductor of the integrated-web down conductor during manufacture;
  d) Reduced manufacturing complexity and reduced associated cost. This may be a direct result of fewer space constraints on fitting components within the tip end of the blade (as there are fewer individual components), or a result of ease of locating drill holes, as the integrated web-down conductor may be in a thin laminate region of the blade shell with no core; and
  e) Introduction of the possibility to use receptor bolts on windward and leeward sides of the blade that are aligned in a thickness direction of the blade, due to increased thickness of a receptor block of the integrated web-down conductor compared to a typical down conductor receptor block. In a typical blade, a receptor block, which is located on the down conductor, cannot be located at the maximum thickness location of the blade, as that space is occupied by a web. By the invention, a receptor block can be located at a maximum thickness location of the blade, because it is integrated with the web. As such, the receptor block can be thicker than those of known blade lightning protection systems.

A first aspect of the invention provides a wind turbine blade having a root end, a tip end, a blade shell, a lightning protection system and an integrated web-down conductor, the integrated web-down conductor comprising:
  a down conductor forming part of the lightning protection system;
  electrical insulation surrounding the down conductor; and
  a web that surrounds the electrical insulation so as to enclose the down conductor and electrical insulation and is coupled to the blade shell.

The wind turbine blade may have a blade section. The integrated web-down conductor may be at a maximum thickness of the blade section.

The blade may have a span extending in a span-wise direction from the root end to the tip end of the blade. The integrated web-down conductor may extend from adjacent the tip end of the blade up to a span-wise position. This extension may extend so as to terminate within 15% of the blade span away from the tip end. This extension may extend so as to terminate within 10% of the blade span away from the tip end. This extension may extend so as to terminate within 5% of the blade span away from the tip end.

The blade may comprise a secondary web and/or a secondary down conductor. The secondary web and/or secondary down conductor may be disposed inboard of the integrated-web down conductor. The secondary web and secondary down conductor may be provided as separate, not integrated, components.

The integrated web-down conductor may extend from adjacent the tip end of the blade up to a span-wise position at which it terminates. There may be no other web component disposed outboard of where the integrated web-down conductor terminates. There may be no other down conductor component disposed outboard of where the integrated web-down conductor terminates.

The web may define a filled tubular shape. The web may define a filled tubular shape in which the down conductor and electrical insulation are disposed.

The web may comprise a material laminate, preferably a fibre composite material laminate, preferably a glass fibre composite material laminate, preferably a biaxial glass fibre composite material laminate.

The integrated web-down conductor may comprise a filler component, such as a foam core. The filler component may be disposed around the electrical insulation between the electrical insulation and the web.

The lightning protection system may further comprise at least one lightning receptor. The at least one lightning receptor may be disposed near or at an outer surface of the blade shell. The at least one lightning receptor may be electrically connected to the down conductor.

The lightning receptor may be electrically coupled to the down conductor. The receptor may extend through the electrical insulation to a receptor block. The receptor block may have a width greater than a diameter of the down conductor. The receptor block may be electrically coupled to the down conductor. The filler component may be disposed around the electrical insulation and between adjacent receptor blocks. In this way the filler component may enable a constant section web around both the filler component and the receptor blocks.

A second aspect of the invention provides an integrated web-down conductor component for a wind turbine blade, the integrated web-down conductor component comprising:

a down conductor for forming part of a lightning protection system of the wind turbine blade;

electrical insulation surrounding the down conductor; and a web surrounding the electrical insulation so as to enclose the down conductor and electrical insulation and configured for coupling to a blade shell of the wind turbine blade.

A third aspect of the invention provides a method of forming an integrated web-down conductor, comprising:

providing a down conductor, forming electrical insulation around the down conductor, forming a web around the electrical insulation so as to enclose the down conductor and electrical insulation.

Forming a web around the electrical insulation may comprise wrapping material around the electrical insulation and/or a filler component such as a foam core so as to form a material laminate web.

A fourth aspect of the invention provides a method of manufacturing a wind turbine blade, comprising:

providing an integrated web-down conductor and a blade shell, the integrated web-down conductor having a down conductor, electrical insulation surrounding the down conductor and a web surrounding the electrical insulation so as to enclose the down conductor and electrical insulation, arranging the integrated web-down conductor relative to the blade shell, and fixing the integrated web-down conductor to the blade shell.

The blade shell may comprise first and second blade shell halves. The method of manufacture may comprise fixing the integrated web-down conductor to one of the first and second blade shell halves. The method of manufacture may then comprise fixing the second blade shell half to the first blade shell half and to the integrated web-down conductor.

The method of manufacture may further comprise electrically connecting one or more lightning receptors at or near the outer surface of the blade shell to the down conductor.

BRIEF DESCRIPTION OF THE DRAWINGS

Embodiments of the invention will now be described with reference to the accompanying drawings, in which.

DETAILED DESCRIPTION OF EMBODIMENT(S)

In this specification, terms such as root end, tip end, span-wise, leading edge, trailing edge, and web, are used. While these terms are well known and understood to a person skilled in the art, definitions are given below for the avoidance of doubt.

The term "root" used herein in relation to a blade end, refers to an end of the blade at which the blade is attached to a hub 18 of a turbine 10. The term "tip" used herein in relation to a blade end, refers to a blade end that is radially furthest away from the axis of rotation of the hub.

The term "leading edge" is used to refer to an edge of the blade which will be at the front of the blade as the blade rotates in the normal rotation direction of the wind turbine rotor.

The term "trailing edge" is used to refer to an edge of a wind turbine blade which will be at the back of the blade as the blade rotates in the normal rotation direction of the wind turbine rotor.

The term "span-wise" is used to refer to a dimension or direction from a root end of a wind turbine blade to a tip end of the blade, or vice versa. When a wind turbine blade is mounted on a wind turbine hub, the span-wise and radial directions of the wind turbine blade will be substantially the same.

A pressure side or surface (or windward side or surface) of a wind turbine blade is a side or surface between the leading edge and the trailing edge, which, when in use, has a higher pressure than a suction side or surface of the blade.

A suction side or surface (or leeward side or surface) of a wind turbine blade is a side or surface between the leading edge and the trailing edge, which will have a lower pressure acting upon it than that of a pressure side or surface, when in use.

The chord of a blade is the straight line distance from the leading edge to the trailing edge in a given cross section perpendicular to the blade span-wise direction.

The thickness of a wind turbine blade is measured perpendicularly to the chord of the blade and is the greatest distance between the pressure surface and the suction surface in a given cross section perpendicular to the blade span-wise direction.

The term "inboard" is used to refer to a portion of the blade closer to the root end than the tip end in the span-wise direction. The term "outboard" is used to refer to a portion of the blade closer to the tip end than the root end in the span-wise direction. The terms "inboard of" and "outboard of" when used to describe relative positions of components, means "closer to a root end than" and "closer to a tip end than", respectively.

The term "web" (also known as a shear web) is used to refer to refer to a longitudinal, generally span-wise extending, reinforcing member of the blade that can transfer load from one of the windward and leeward sides of the blade to the other of the windward and leeward sides of the blade. The "web" may, together with spar caps, form part of a longitudinal reinforcing spar or support member of the blade. The spar caps may be embedded in the blade shell, or may be attached to the blade shell. The spar caps of the windward and leeward sides of the blade may be joined by the one or more webs extending through the interior hollow space of the blade.

The term "shell" is used to refer to an outer aerodynamic structure of the blade. The shell may be provided as two shell halves, which may be bonded together by an adhesive.

Figure 1:
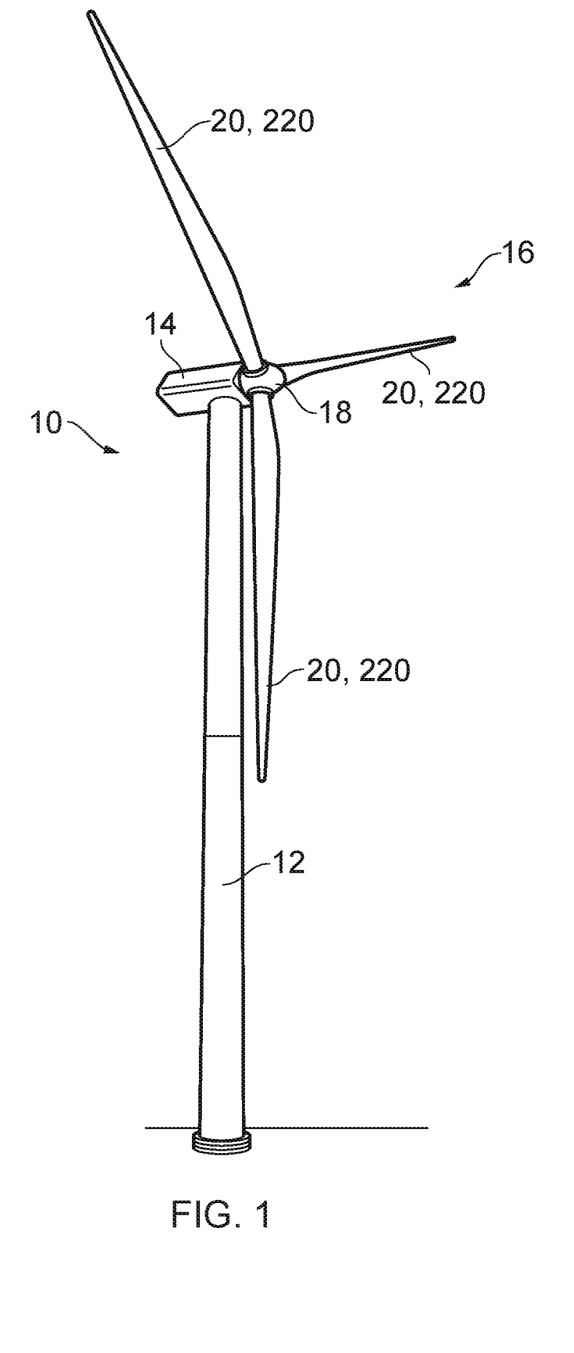
FIG. 1 shows a wind turbine.

FIG. 1 shows a wind turbine 10 including a tower 12 and a nacelle 14 disposed at the apex of the tower 12.

A rotor 16 is operatively coupled via a gearbox to a generator (not shown) housed inside the nacelle 14. The rotor 16 includes a central hub 18 and a plurality of rotor blades 20, 220 which project outwardly from the central hub 18. While the example shown in FIG. 1 has three blades, it will be understood by the skilled person that other numbers of blades are possible.

When wind blows against the wind turbine 10, the blades 20, 220 generate a lift force which causes the rotor 16 to rotate, which in turn causes the generator within the nacelle 14 to generate electrical energy.

FIG. 2 illustrates a wind turbine blade 20 for use in such a wind turbine 10. The wind turbine blade 20 has a root end 21 and a tip end 22. The wind turbine blade 20 has a leading edge 28 and a trailing edge 29.

The wind turbine blade 20 of FIG. 2 has a known lightning protection system. This known lightning protection system comprises a tip down conductor 110, a surface protection layer 150 and a root down conductor 130. The tip down conductor 110, surface protection later 150, and root down conductor 130 are all configured to provide a path for electrical charge for lightning from the tip end 22 of the blade 20 to the root end 21 of the blade 20. In this known lightning protection system, the tip down conductor 110 and root down conductor 130 are provided as a wire or cable. The surface protection layer 150 is an electrically conductive foil such as a metal foil, which may be covered by a layer of material, such as a glass layer. The surface protection layer 150 can have a mesh configuration or be an expanded metal foil.

As shown in FIG. 2, the blade 20 having a known lightning protection system also has various structural components i.e. a first web 141 and a second web 142. As shown in FIG. 2, the first web 141 extends from proximate the root end 21 towards the tip end 22. The second web 142 also extends from the root end 21 towards the tip end 22. The first web 141 extends further towards the tip end 22 than the second web 142. The first web 141 is arranged closer to the leading edge 28 than the second web 142. The webs 141, 142 of this known blade 20 are configured to provide structural support within the blade shell.

As a skilled person will appreciate, the webs 141, 142 and the lightning protection system (tip down conductor 110, surface protection layer 150 and root down conductor 130) are separate components, having separate functions. At the tip end of the blade, outboard of the surface protection layer 150, the tip down conductor 110 and first web 141 extend separately, alongside one another in a span-wise direction of the blade 20.

In contrast to this known blade having a known lightning protection system, the present disclosure provides an integrated web-down conductor 250.

Figure 3:
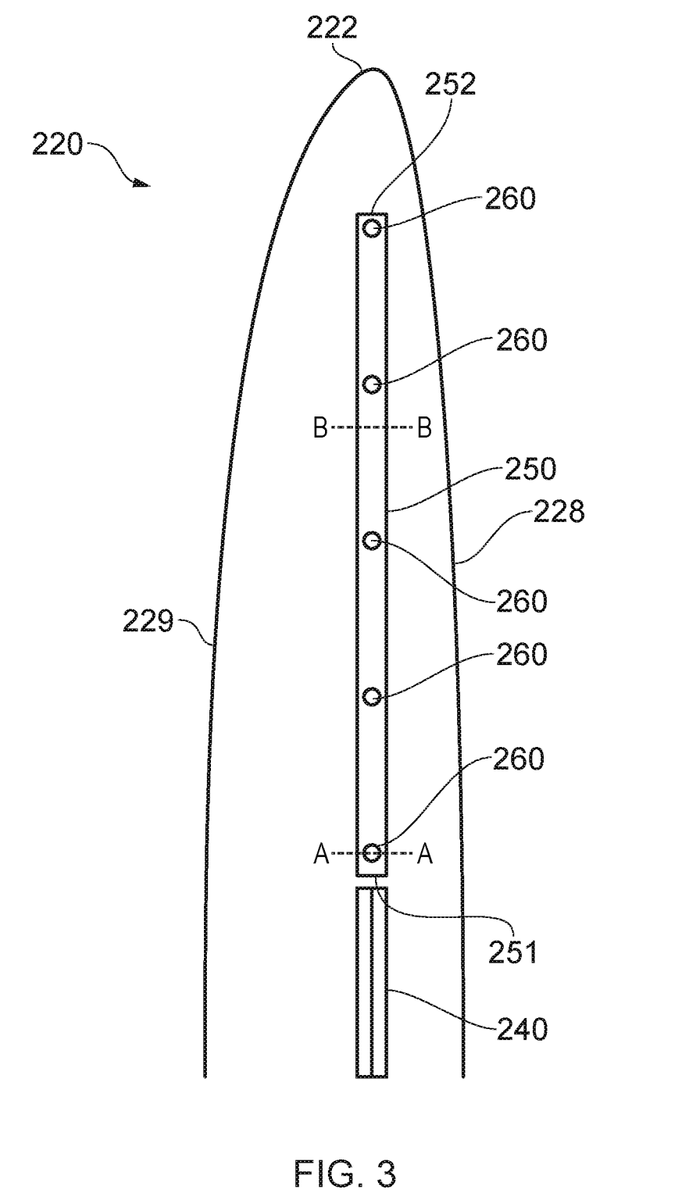
FIG. 3 shows a blade having an integrated web-down conductor of a first example.

A tip portion of a blade 220 including an example of an integrated web-down conductor 250 can be seen in FIG. 3. Similar to the blade 20 of FIG. 2, the blade 220 has a tip end 222, a leading edge 228 and a trailing edge 229. The blade 220 also has a root end (not shown).

Figure 5:
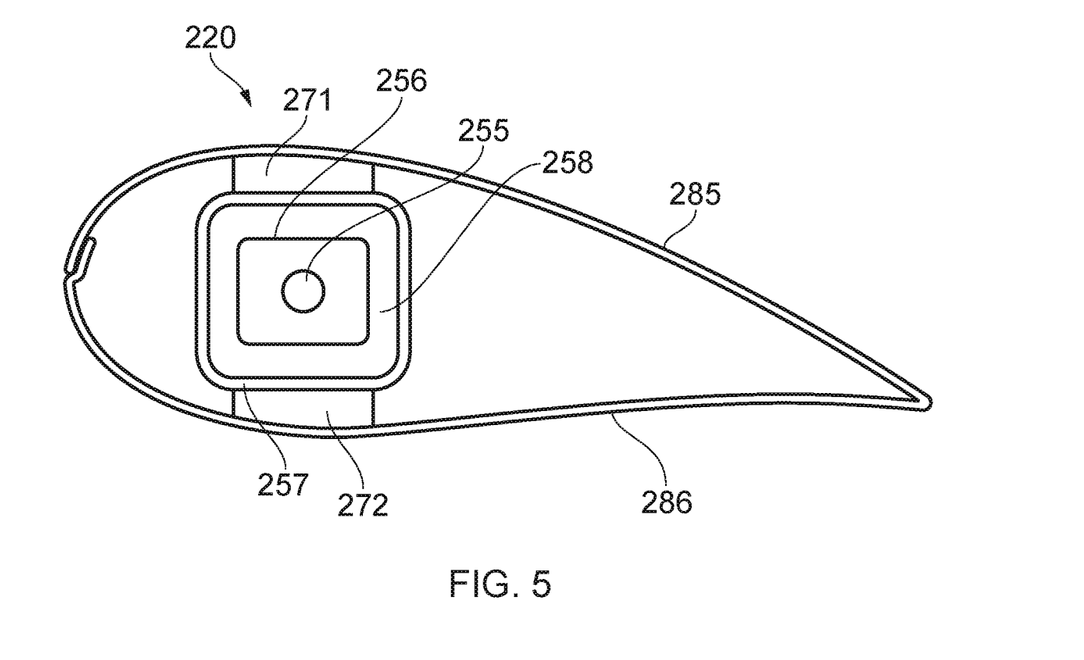
FIG. 5 shows cross-section B-B of the blade of FIG. 3.

The integrated web-down conductor 250 is configured to conduct electrical charge from a tip end 222 of the blade, or from proximate a tip end 222 of the blade, towards a root end of the blade. The integrated web-down conductor 250 is also configured to transmit structural load between a windward side 286 and a leeward side 285 of the blade 220. As best seen in FIG. 5, the integrated web-down conductor 250 comprises a down conductor 255, electrical insulation 256 and a web 257.

The down conductor 255 forms part of the lightning protection system. The down conductor 255 is configured to carry electrical charge from at or proximate the tip end 222 of the blade towards the root end of the blade. As such, the down conductor 255 of the integrated web-down conductor 250 comprises or consists of an electrically conductive material such as a metal or alloy. The down conductor 255 may be provided as a cable, a wire or any other appropriate component.

The electrical insulation 256 surrounds the down conductor 255. The electrical insulation 256 is configured to provide an electrically insulating barrier around the down conductor 255. The electrical insulation 256 may also provide a barrier between the down conductor 255 and the web 257. There may be provided a filler component 258 around the electrical insulation 256, between the electrical insulation 256 and the web 257, as will be described later.

The web 257 passes around the electrical insulation 256 so as to enclose, or encapsulate, the down conductor 255 and the electrical insulation 256, and optional filler component 258. By "enclosing", the web may entirely surround the down conductor 255 and the electrical insulation 256, and optionally the filler component 258, in at least two dimensions. The web 257 may form or define a substantially continuous loop in transverse cross section, inside of which the down conductor 255 and/or the electrical insulation 256 and/or the filler component 258 may be disposed. The down conductor 255 and/or the electrical insulation 256, and/or the filler component 258 may be wholly disposed within the web 257. The web 257 may define a filled tubular shape, in which the down conductor 255 and electrical insulation 256 and optional filler component 258 are disposed. A tubular shape provides a particularly effective integrated web-down conductor, which is easy to manufacture and easy to assemble into a blade shell, while benefiting from good structural properties.

The web 257 is configured to act as a structural component that can, in conjunction with other components of the integrated web-down conductor 250, convey loads between a windward side 286 and a leeward side 285 of the blade 220. The web 257 may comprise a material laminate such as a fibre composite material laminate. Preferably, the web 257 comprises a glass fibre reinforced plastic (GFRP) composite material laminate, preferably a biaxial (GFRP) composite material laminate. Use of a material laminate provides a web 257 that is strong and easy to manufacture.

Figure 4:
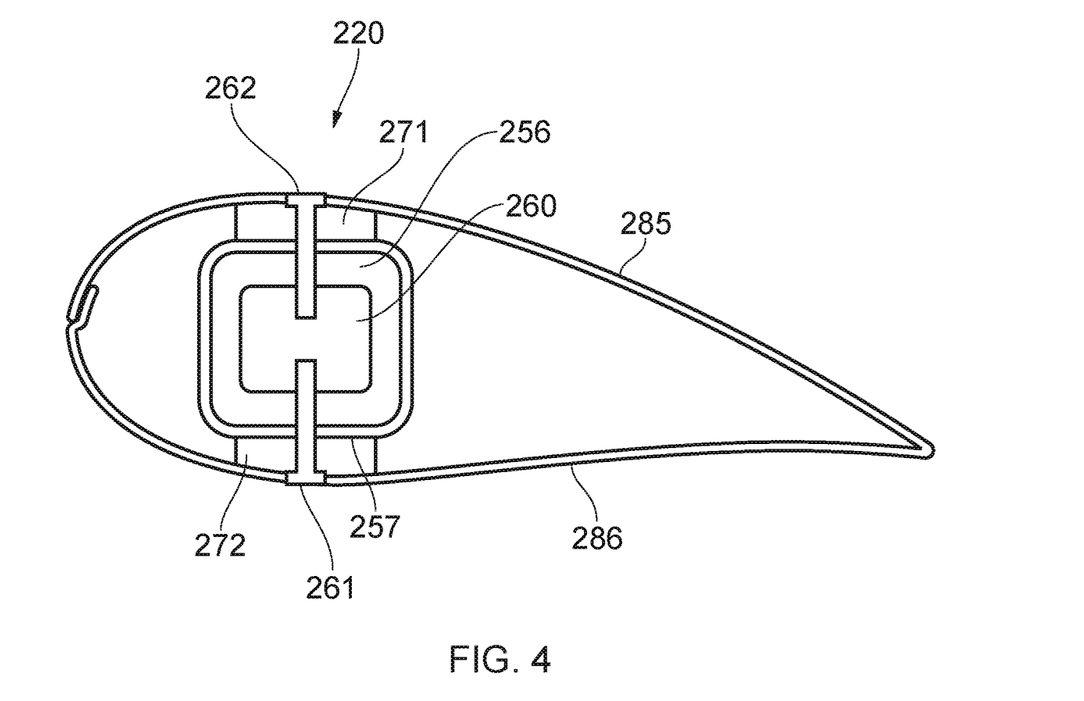
FIG. 4 shows cross-section A-A of the blade of FIG. 3.

The arrangement and configuration of the integrated web-down conductor 250 may be best seen in FIGS. 4 and 5. The integrated web-down conductor 250 has a root end 251 and a tip end 252. The integrated web-down conductor 250 may be disposed, at a position within a cross-section of the blade shell, at a location of the highest second moment of inertia of the blade. The wind turbine blade 220 has a blade section, and the integrated web-down conductor 250 may be disposed at a maximum thickness of the blade section, i.e. at a location where there is the highest second moment of inertia of the blade. The integrated web-down conductor 250 may have a cross-sectional shape that varies along its length, i.e. from its tip end 252 to root end 251, in a span-wise direction. The integrated web-down conductor 250 may have a cross-sectional shape that at least partially aligns with the blade shell. The integrated web-down conductor 250 may have a width that is substantially constant along its length, i.e. in a span-wise direction. The integrated web-down conductor 250 may have a height that varies along its length i.e. in a span-wise direction. The integrated web-down conductor 250 may have a height that increases along its length, such that it has a greater height at its root end 251 than at its tip end 252. The integrated web-down conductor 250 may at least partly define a rounded square-shape in cross-section.

The integrated web-down conductor 250 may extend from the tip end 222 of the blade towards the root end of the blade. The blade 220 may have a span extending in a span-wise direction from its root end to its tip end 222. The integrated web-down conductor 250 may extend from adjacent the tip end 222 of the blade 220 up to a span-wise position so as to terminate within 15% of the blade span away from the tip end 222, optionally within 10%, optionally within 5%. The integrated web-down conductor 250 may extend from adjacent the tip end 222 of the blade 220 up to or proximate a most inboard receptor 261, 262. The integrated web-down conductor 250 may not extend towards the root substantially further than where receptors 261, 262 are disposed. By not extending the integrated web-down conductor 250 further towards the root end 221, i.e. by terminating the integrated web-down conductor 250 at one of the locations described herein, the overall weight of the blade is reduced, while benefitting from use of the integrated-web down conductor 250 at a location where its effects are the most beneficial. The integrated web-down conductor 250 may extend up to a secondary web 240. The integrated web-down conductor 250 may be aligned with and/or connected to and/or fixedly attached to the secondary web 240. There may be provided a secondary down conductor (not shown) provided inboard of the integrated web-down conductor 250. The integrated web-down conductor 250 may be aligned with the secondary web 240 so as to define or form a continuous line. Aligning the integrated web-down conductor 250 with the secondary web 240 may ensure that blade loads are optimally supported. The blade 220 may be configured such that there is no other web component disposed outboard of where the integrated web-down conductor 250 terminates, i.e. outboard of the root end 251 of the integrated web-down conductor 250. This has the advantage that all the shear load between the two blade shell halves is transferred by the integrated web-down conductor 250. The blade 220 may be configured such that there is no other down conductor component disposed outboard of where the integrated web-down conductor terminates, i.e. outboard of the root end 251 of the integrated web-down conductor 250. For example, with reference to FIG. 3, the secondary web 240 does not extend past where the integrated web down conductor 250 terminates at root end 251. In FIG. 3, there is also no other down conductor component disposed outboard of where the integrated web down conductor 250 terminates at root end 251.

The web 257 of the integrated web-down conductor 250 may be fixedly attached to the shell of the blade 220 by means of one or more attachment components, such as an adhesive, epoxy, or glue. There may be provided a first attachment component 271 on a leeward side of the web 257 configured to attach a side of the web 257 to the leeward side 285 of the blade 220. There may be provided a second attachment component 272 configured to fixedly attach a side of the web 257 to a windward side 286 of the blade 220. As noted above, the blade shell may comprise a first shell half 285 and a second blade shell half 286. In this instance a first attachment component 271 may be configured to attach the web 257 to the first blade shell half 285, and/or the second attachment component 272 may be configured to attach the web 257 to the second blade shell half 286. As indicated in FIGS. 4 and 5, the attachment component (i.e. adhesive) used may have a thickness greater than the thickness of the web 257. The first and/or second attachment components 271, 272 may be provided in sections along the length, i.e. in a span-wise direction, of the integrated web-down conductor 250.

The lightning protection system may comprise at least one lightning receptor block 260. The, or each lightning receptor block 260 may be electrically conductive. The, or each lightning receptor block 260 may comprise or consist of a metal or alloy. The, or each lightning receptor block 260 may be disposed substantially centrally within the blade shell, between windward and leeward sides of the blade, and is electrically connected to the down conductor 255. There may be provided a plurality of receptor blocks 260, for example as shown in FIGS. 3 and 4. There may be provided one, two, three, four, five or more receptor blocks 260 within the integrated web-down conductor 250. The, or each receptor block 260 may be substantially cuboidal or rectangular cuboidal shaped. The, or each receptor block 260 may have a width larger than the width of the down conductor 255. This has the advantage that the receptor block 260 is easily connected to the one or more receptors 261, 262, i.e. when drilling through the blade shell to install receptors 261, 262, a drill can easily be positioned from outside the blade to drill into the receptor block 260. As such, an effective connection between the one or more receptors 261, 262 and the receptor block 260 can be established with reduced manufacturing accuracy, and in turn reduced manufacturing time and cost. The, or each receptor block 260 may have a depth larger than a corresponding depth of the down conductor 255. The, or each receptor block 260 may be disposed within the integrated web-down conductor 250 so as to be enclosed or encapsulated by electrical insulation 256 and optionally the filler component 258 of the integrated web-down conductor 250. The, or each receptor block 260 may also be disposed within the web 257 of the integrated web-down conductor 250 so as to be enclosed or encapsulated by the web 257. The, or each receptor block 260 may be disposed centrally within the electrical insulation 256 and/or web 257.

Figure 6:
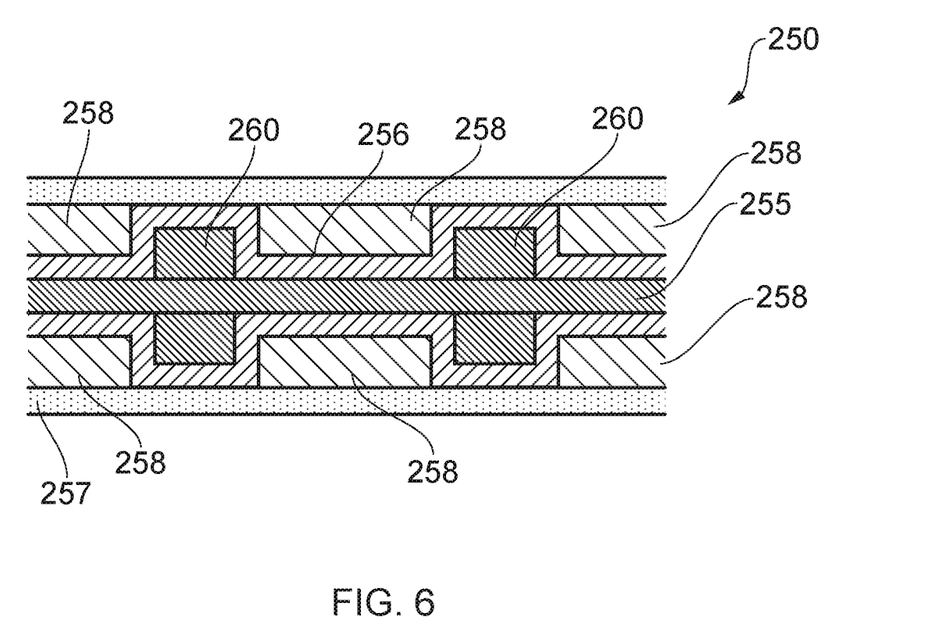
FIG. 6 shows an integrated web-down conductor with a filler component.

As shown in FIG. 6, there may be provided a plurality of receptor blocks 260 spaced along the length of the down conductor 255. A discussed previously the receptor blocks 260 may have a greater width than the down conductor 255. Both the receptor blocks 260 and the down conductor 260 may be surrounded by the electrical insulation 256 which creates a generally stepwise profile of the electrical insulation 256. It may be undesirable to increase the thickness of the electrical insulation 256 around the down conductor 255 between a pair of the receptor blocks 260. However, it may also be undesirable to provide the web 257 having a stepwise profile to follow the stepwise profile of the electrical insulation. Accordingly, the filler component 258 may be provided surrounding the electrical insulation 256 between the pair of the receptor blocks 260. The filler component 258 may have a thickness such that the web 257 may have a constant cross section tubular shape.

The or each receptor block 260 may be disposed centrally within the filler component 258. The filler component 258 may be a foam core. The filler component 258 may substantially fill space between the electrical insulation 256 and the web 257. As can be seen from FIG. 6, the filler component 258 can prevent stepwise changes in the cross-section of the integrated web-down conductor 250, which has the advantage of improving the ease with which the integrated web-down conductor can be adhered to the blade shell. It also allows the down conductor 255, receptors 260 and electrical insulation 256 to be easily surrounded by the web 257, which may be a wrapped material.

There may be provided one or more receptors, which may be receptor bolts 261, 262. The, or each receptor bolt 261, 262 may be configured and/or arranged and/or adapted to provide a lightning attachment point on the blade. The, or each receptor bolt 261, 262 may be electrically connected or coupled to the down conductor 255. This has the advantage that despite the down conductor 255 being surrounded by the web 257, the benefits of electrically connecting the lightning receptors 261, 262 to the down conductor 255 are still realised.

The, or each receptor bolt 261, 262 is configured to extend between a side of the blade shell and a receptor block 260. The, or each receptor bolt 261 is configured to be electrically conductive. The, or each receptor bolt 261 may comprise or consist of a metal or alloy and/or may comprise the same or a similar material to the, or each receptor block 260. The, or each receptor bolt 261, 262 may be electrically connected or coupled to the down conductor 250 by at least one receptor block 260. For each receptor block 260 there may be provided a first receptor bolt 261 and a second receptor bolt 262. The first receptor bolt 261 may extend from a windward surface of the blade shell to the receptor block 260. The second receptor bolt 262 may extend from a leeward surface of the blade shell to the receptor block 260. Where two receptor bolts 261, 262 are provided for the, or each receptor block 260, the receptor bolts 261 and 262 may be substantially aligned with one another in a thickness direction of the blade. In such a case, each first receptor bolt 261 may be aligned with a corresponding second receptor bolt 262 such that each first receptor bolt 261 and second receptor bolt 262 can occupy substantially the same position along a span-wise direction of the blade. Each first receptor bolt 261 and second receptor bolt 262 may have a length, and each first receptor bolt 261 and second receptor bolt 262 may be aligned so as to define a substantially straight line between their lengths. This has the advantage of permitting smaller receptor blocks 260 in a chord-wise and span-wise dimension than previously. The receptor blocks 260 can be made to substantially the same volume as prior receptor blocks but with a smaller chord-wise and span-wise dimension and a larger thickness dimension, which is accommodated by the integrated web-down conductor 250 being disposed at a maximum thickness location of the blade.

The integrated web-down conductor 250 may be formed by a method comprising:
providing a down conductor 255,
forming electrical insulation around the down conductor 256,
forming a web 257 around the electrical insulation 256 so as to enclose or encapsulate the down conductor 255 and electrical insulation 256.

Forming a web 257 around the electrical insulation 256 may comprise wrapping material around the electrical insulation 256 and/or a foam core so as to form a material laminate web. The resulting web 257 may comprise a structure indicative of having been manufactured by such a wrapping step, i.e. comprise layers of wrapped material.

The wind turbine blade 220 may be manufactured by a method, comprising:
providing an integrated web-down conductor 250 and a blade shell, the integrated web-down conductor 250 having a down conductor 255, electrical insulation 256 surrounding the down conductor 255 and a web 257 surrounding the electrical insulation 256 so as to enclose or encapsulate the down conductor 255 and electrical insulation 256,
arranging the integrated web-down conductor 250 relative to the blade shell, and
fixing the integrated web-down conductor 250 to the blade shell.

Where the blade shell comprises first and second blade shell halves 285, 286, the method may comprise fixing the integrated web-down conductor 250 to one of the first and second blade shell halves 285, 286, and then fixing the second blade shell half 286 to the first blade shell half 285 and to the integrated web-down conductor 250. This has the advantage of ease of manufacture, while providing a structurally reliable blade.

The method of manufacturing a blade 220 may further comprise electrically connecting one or more lightning receptors 262, 262 at or near the outer surface of the blade shell to the down conductor 250, which may be via a receptor block 260. The method of manufacturing a blade 220 may further comprise inserting one or more receptor bolts 261, 262 to provide an electrical connection from the or each receptor block 260 to the blade shell, through the or each receptor bolt 261, 262.

As the skilled person will appreciate, the integrated web-down conductor and its associated aspects disclosed herein have various advantages. Some of these advantages are noted above as a) to e) in the summary of the invention.

Firstly, as regards advantage a), the performance of the blade resulting from the use of an integrated web-down conductor is significantly improved. Instead of providing a separate down-conductor and web/spar component, each disposed at different locations and having different attachment means, for example as noted in relation to FIG. 2, a single integrated web-down conductor component is provided. This provides a significant mass reduction overall, as there is no need for two separate components to be attached to the blade shell.

Secondly, as regards advantage b), a reduction in mass at the blade tip has a significant effect on load distribution within the blade during use. As the skilled person will appreciate, mass at the tip end of the blade contributes significantly to the mass moment of the blade. This mass reduction may result from a reduction in adhesive required compared to a separate web and down conductor of a known blade, in which adhesive is required to attach the down conductor to the blade shell and to attach the web to the blade shell. In contrast, with an integrated web-down conductor, adhesive may only be needed to attach the integrated web-down conductor to the blade shell. This mass reduction may also result from less overall components, and less associated mass of the integrated web-down conductor compared to a separate web and down conductor.

Thirdly, as regards advantage c), the integrated web-down conductor provides improved lightning protection properties. This results from improved accuracy during manufacture as the integrated web-down conductor can be more easily and more accurately attached to the blade shell, compared to a single down conductor such as the wire or cable. This results from the down conductor being integrated into the web, its resulting structure being stiffer than a down conductor provided as a separate component to the web, such as a flexible down-conductor wire.

Fourthly, as regards advantage d), manufacture simplicity and associated costs are significantly improved. There is a reduction in complexity and associated costs from reducing the overall number of components during manufacture that need to be assembled into the blade shell. In addition, the inventor has identified that the step of attaching and assembling a rigid integrated web-down conductor into the blade shell is easier than aligning and attaching a flexible down conductor independently of a web component. As such, less tooling may be required to align the integrated web-down conductor during manufacture, saving time, tooling and associated cost. As explained above, the manufacturing simplicity may also be a direct result of fewer space constraints on fitting components within the tip end of the blade (as there are fewer individual components), or a direct result of ease of locating drill holes, as the integrated web-down conductor may be in a thin laminate region of the blade shell with no core.

Fifthly, as regards advantage e), it is possible to use aligned receptor bolts 261, 262 with the integrated web-down conductor. This can be seen, for example, in FIG. 4, in which receptor bolts 261, 262 are aligned in a thickness direction of the blade 220, as described above. Such an alignment may not be possible where the down conductor and a web are provided as separate components, as any receptor block provided with a separate down conductor is likely to have a practical limit on its depth and thickness compared to those used with an integrated web-down conductor 250.

Although the invention has been described above with reference to one or more preferred embodiments, it will be appreciated that various changes or modifications may be made without departing from the scope of the invention as defined in the appended claims.

Although a blade construction involving a blade shell or two blade shell halves has been shown in some of the figures and described, the skilled person would appreciate that the examples implemented may be implemented in other blade structures.

Although a web 257 having a tubular construction has been shown in some of the figures and described, the skilled person would appreciate that the web 257 may have a different configuration. For example, the web may be provided as discrete, sections assembled to form a tubular shape. The web 257 may be provided as a substantially continuous loop in two dimensions, or may contain one or more breaks or apertures.

The invention claimed is:

1. A wind turbine blade having a root end, a tip end, a blade shell, a lightning protection system and an integrated web-down conductor, the integrated web-down conductor comprising:
   a down conductor forming part of the lightning protection system;
   electrical insulation surrounding the down conductor;
   a web that surrounds the electrical insulation so as to enclose the down conductor and electrical insulation and is coupled to the blade shell; and
   at least one lightning receptor near or at an outer surface of the blade shell and electrically connected to the down conductor,
   wherein the at least one lightning receptor extends through the electrical insulation to a receptor block, the receptor block being electrically coupled to the down conductor, and
   wherein the blade has a span extending in a span-wise direction from the root end to the tip end of the blade and the integrated web-down conductor extends from adjacent the tip end of the blade up to a span-wise position so as to terminate within 15% of the blade span away from the tip end.

2. The wind turbine blade of claim 1, wherein the wind turbine blade has a blade section, and the integrated web-down conductor is at a maximum thickness of the blade section.

3. The wind turbine blade of claim 1, comprising a secondary web and a separate secondary down conductor provided as separate, not integrated, components, disposed inboard of the integrated web-down conductor.

4. The wind turbine blade of claim 1, wherein there is no other web component disposed outboard of where the integrated web-down conductor terminates, and/or there is no other down conductor component disposed outboard of where the integrated web-down conductor terminates.

5. The wind turbine blade of claim 1, wherein the web defines a filled tubular shape, in which the down conductor and electrical insulation are disposed.

6. The wind turbine blade of claim 1, wherein the web comprises a material laminate.

7. The wind turbine blade of claim 1, wherein the integrated web-down conductor comprises a filler component disposed around the electrical insulation between the electrical insulation and the web.

8. The wind turbine blade of claim 1, wherein the receptor block has a width greater than a diameter of the down conductor.

9. A method of manufacturing a wind turbine blade, comprising:
   providing an integrated web-down conductor and a blade shell, the integrated web-down conductor having a down conductor, electrical insulation surrounding the down conductor and a web surrounding the electrical insulation so as to enclose the down conductor and electrical insulation,
   arranging the integrated web-down conductor relative to the blade shell,
   fixing the integrated web-down conductor to the blade shell, and
   electrically connecting at least one lightning receptor at or near an outer surface of the blade shell to the down conductor,
   wherein the at least one lightning receptor extends through the electrical insulation to a receptor block, the receptor block being electrically coupled to the down conductor, and
   wherein the blade has a span extending in a span-wise direction from a root end to a tip end of the blade and the integrated web-down conductor extends from adjacent the tip end of the blade up to a span-wise position so as to terminate within 15% of the blade span away from the tip end.

10. The method of claim 9, wherein the blade shell comprises first and second blade shell halves, and the method comprises fixing the integrated web-down conductor to one of the first and second blade shell halves, and then fixing the second blade shell half to the first blade shell half and to the integrated web-down conductor.

11. A wind turbine blade, comprising:
   a root end,
   a tip end,
   a blade shell,
   a lightning protection system, and
   an integrated web-down conductor, the integrated web-down conductor comprising:
     a down conductor forming part of the lightning protection system,
     electrical insulation surrounding the down conductor,
     a web that surrounds the electrical insulation so as to enclose the down conductor and electrical insulation and is coupled to the blade shell, and
     at least one lightning receptor near or at an outer surface of the blade shell and electrically connected to the down conductor,
     wherein the at least one lightning receptor extends through the electrical insulation to a receptor block, the receptor block being electrically coupled to the down conductor, and
   a secondary web and a separate secondary down conductor provided as separate, not integrated, components, disposed inboard of the integrated web-down conductor.

12. The wind turbine blade of claim 11, wherein the wind turbine blade has a blade section, and the integrated web-down conductor is at a maximum thickness of the blade section.

13. The wind turbine blade of claim 11, wherein the integrated web-down conductor extends from adjacent the tip end of the blade up to a span-wise position at which it terminates, and there is no other web component disposed outboard of where the integrated web-down conductor terminates, and/or there is no other down conductor component disposed outboard of where the integrated web-down conductor terminates.

14. The wind turbine blade of claim 11, wherein the web of the integrated web-down conductor defines a filled tubular shape, in which the down conductor of the integrated web-down conductor and electrical insulation are disposed.

15. The wind turbine blade of claim 11, wherein the web of the integrated web-down conductor comprises a material laminate.

16. The wind turbine blade of claim 11, wherein the integrated web-down conductor comprises a filler component disposed around the electrical insulation between the electrical insulation and the web of the integrated web-down conductor.

17. The wind turbine blade of claim 11, wherein the receptor block has a width greater than a diameter of the down conductor of the integrated web-down conductor.

18. A method of manufacturing a wind turbine blade, comprising:

providing an integrated web-down conductor and a blade shell, the integrated web-down conductor having a down conductor, electrical insulation surrounding the down conductor and a web surrounding the electrical insulation so as to enclose the down conductor and electrical insulation, arranging the integrated web-down conductor relative to the blade shell, fixing the integrated web-down conductor to the blade shell, and electrically connecting at least one lightning receptor at or near an outer surface of the blade shell to the down conductor, wherein the at least one lightning receptor extends through the electrical insulation to a receptor block, the receptor block being electrically coupled to the down conductor, and providing a secondary web and a separate secondary down conductor as separate, not integrated, components, disposed inboard of the integrated web-down conductor.

* * * * *